UNITED STATES PATENT OFFICE.

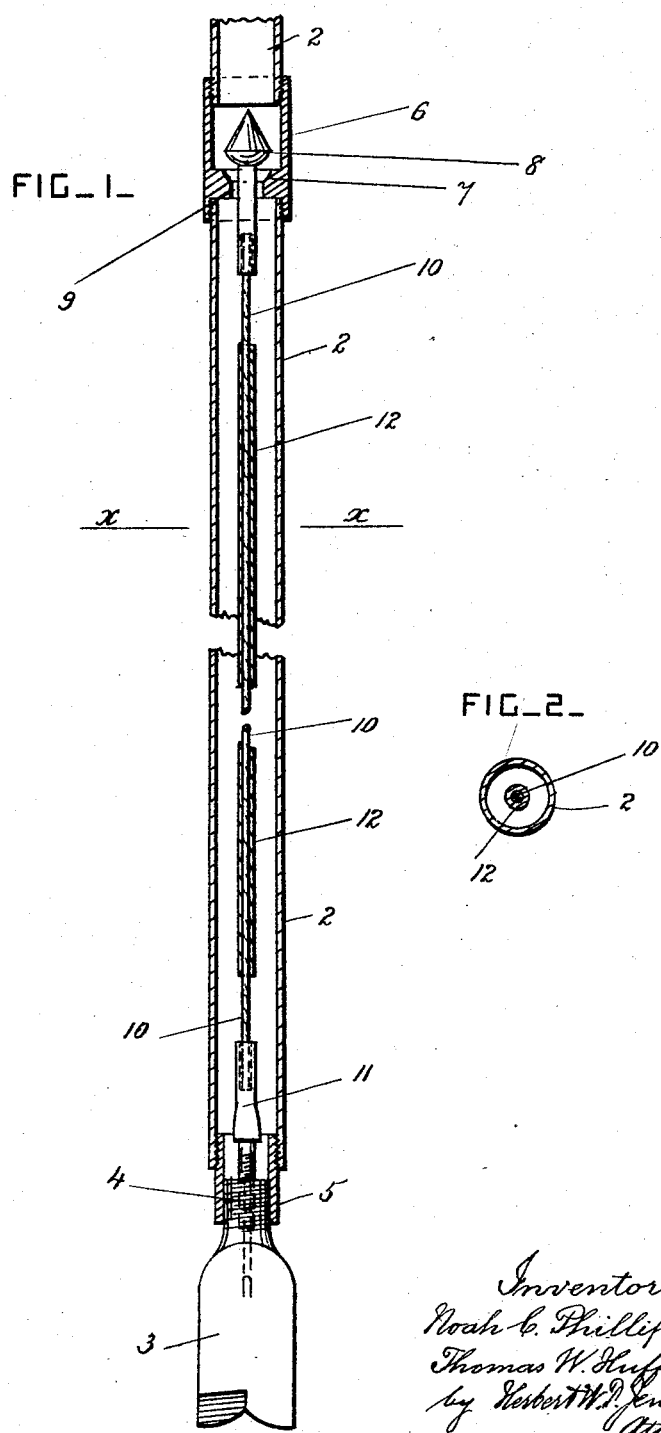

NOAH C. PHILLIPS AND THOMAS W. HUFF, OF HOSSTON, LOUISIANA.

OIL-DRILL.

1,304,364.   Specification of Letters Patent.   Patented May 20, 1919.

Application filed February 14, 1919.   Serial No. 277,018.

*To all whom it may concern:*

Be it known that we, NOAH C. PHILLIPS and THOMAS W. HUFF, citizens of the United States, residing at Hosston, in the parish of Caddo and State of Louisiana, have invented certain new and useful Improvements in Oil-Drills, of which the following is a specification.

This invention relates to apparatus for boring or drilling wells for oil or other liquids; and it consists in providing the drill pipe with an automatic valve which closes when the drill pipe breaks, as hereinafter fully described and claimed.

In the drawings, Figure 1 is a longitudinal section through portions of an oil drill apparatus constructed according to this invention. Fig. 2 is a cross-section through the drill pipe, taken on the line $x$—$x$ in Fig. 1.

The drill pipe 2 is formed of any suitable number of sections, which are coupled together in any approved manner. The drill bit 3 is of any approved shape, and its shank 4 is secured to the bottom section of the drill pipe 2 by a coupling piece 5.

A cylindrical coupling piece 6 is secured to the upper section of the drill pipe 2, and it has a valve seat 7 formed in it near its lower end. A valve 8 is provided, and is preferably conical in form, and it has a valve stem which passes loosely through the hole 9 in the valve seat 7 and is free to move in all directions.

A flexible connection 10 is provided, and is formed of a steel cable comprising a number of wires twisted together spirally. The upper end of the cable is secured in a hole in the valve stem by means of Babbitt metal, or other suitable means, and its lower end is secured in a hole in a short coupling stem 11 in a similar manner. The coupling stem 11 is screwthreaded and it engages with a screwthreaded hole in the shank of the drill bit.

A casing tube 12 is arranged around the middle part of the steel cable to stiffen it and protect it. The steel cable normally holds the valve open so that the oil or other liquid can be pumped up through the drill pipe. The end portions of the cable 10 are flexible, being arranged to project from the casing tube 12 for a sufficient extent to permit them to bend laterally when the drill bit is displaced, and not sufficiently to cause the cable to change in length by the untwisting of its wires. The casing tube 12 serves to prevent the untwisting of the wire strands of the cable which is inclosed in it; and the cable 10 is made of sufficient strength and stiffness to normally support the parts connected to it in the positions shown in Fig. 1. When, however, the lower end portion of the drill pipe 2 breaks, or the drill bit is otherwise displaced, the valve 8 descends upon its seat 7, and the end portions of the cable bend sufficiently to permit the valve to close the passage through the valve seat in a satisfactory manner, and also hold the drill bit attached to the said valve.

When the drill pipe breaks, its lower end portion and the drill bit are thrown out of line with the upper part of the drill pipe, and the valve drops onto the valve seat and closes it, the flexible cable permitting this action to take place, and the drill pipe is then raised for repair.

What we claim is:

The combination, with an oil drill pipe having a drill bit at its lower end and a valve seat at its upper part, of a valve adapted to close the said valve seat, a coupling stem engaging with the drill bit, a cable of twisted wires having its end portions secured to the said valve and coupling stem, and a casing tube secured around the middle portions of the cable thereby stiffening the said middle portions and preserving the cable from change of length, the end portions of the said cable being exposed at the ends of the casing tube and being free to bend laterally when the drill bit is displaced.

In testimony whereof we affix our signatures.

NOAH C. PHILLIPS.
THOMAS W. HUFF.

Copies of this patent may be obtained for five cents each, by addressing the "Commissioner of Patents, Washington, D. C."